(12) United States Patent
Sporn

(10) Patent No.: US 10,165,760 B2
(45) Date of Patent: *Jan. 1, 2019

(54) DOG HARNESS

(71) Applicant: Joseph S Sporn, New York, NY (US)

(72) Inventor: Joseph S Sporn, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/611,449

(22) Filed: Jun. 1, 2017

(65) Prior Publication Data

US 2017/0265438 A1 Sep. 21, 2017

Related U.S. Application Data

(63) Continuation-in-part of application No. 14/477,597, filed on Sep. 4, 2014, now Pat. No. 9,668,458.

(51) Int. Cl.
*A01K 27/00* (2006.01)
*A44B 11/04* (2006.01)

(52) U.S. Cl.
CPC .......... *A01K 27/005* (2013.01); *A01K 27/002* (2013.01); *A44B 11/04* (2013.01)

(58) Field of Classification Search
CPC ............................... A01K 27/00; A01K 27/002
USPC .................. 119/792, 793, 856, 863
See application file for complete search history.

(56) References Cited

U.S. PATENT DOCUMENTS

| | | | | | |
|---|---|---|---|---|---|
| 2,187,021 | A | * | 1/1940 | Everson | A01K 27/002 119/792 |
| 2,233,397 | A | * | 3/1941 | Bloom | A01K 27/002 119/857 |
| 2,605,744 | A | * | 8/1952 | Urbanski | A01K 27/002 119/856 |
| 3,768,445 | A | * | 10/1973 | Sorrels | A01K 27/002 119/856 |
| 5,150,667 | A | * | 9/1992 | Salidrigas | A01K 27/002 119/863 |
| 5,247,905 | A | * | 9/1993 | Arakawa | A01K 27/002 119/863 |
| 5,427,061 | A | * | 6/1995 | McCullough | A01K 1/0263 119/771 |
| 5,915,335 | A | * | 6/1999 | Holt, Jr. | A01K 1/0263 119/770 |
| 6,101,979 | A | * | 8/2000 | Wilson | A01K 27/002 119/725 |
| 6,637,377 | B2 | * | 10/2003 | Lobanoff | A01K 1/0263 119/770 |
| 6,662,755 | B2 | * | 12/2003 | Kato | A01K 27/002 119/856 |
| 9,668,458 | B2 | * | 6/2017 | Sporn | A01K 27/002 |
| 2008/0047501 | A1 | * | 2/2008 | Madere | A01K 27/002 119/863 |

* cited by examiner

*Primary Examiner* — David J Parsley
(74) *Attorney, Agent, or Firm* — Hanes & Bartels LLC

(57) ABSTRACT

A dog harness having an open prosternum loop and an open sternum loop that are angularly interconnected to form left and right inverted V shaped shoulder covering apexes where the apexes are selectively interconnected with a buckle that slidingly engages adjustable length web members attached to the apexes and which form a point of attachment for a leash.

3 Claims, 3 Drawing Sheets

DOG HARNESS

This application is a continuation-in-part of co-pending U.S. application Ser. No. 14/477,597, filed Sep. 4, 2014, titled Dog Harness, and claims the benefit of the earlier filed application pursuant to 35 U.S.C. § 120.

The present invention relates to small animal harnesses that comprise prosternum and sternum bands, the interconnected ends of which form apexes that are interconnected with webbing loops and a fastener over the dog's withers.

BACKGROUND

Broadly, the type of dog harness that is the subject of the present invention is known but it is the object of the present invention to improve on the fastener assembly that interconnects the side portions of the harness over the dog's withers in order to accommodate dogs of varying shoulder breadth and to provide a greater range of tightness of fit depending on the pulling force exerted by the dog on the leash.

DETAILED DESCRIPTION

Figure 1:
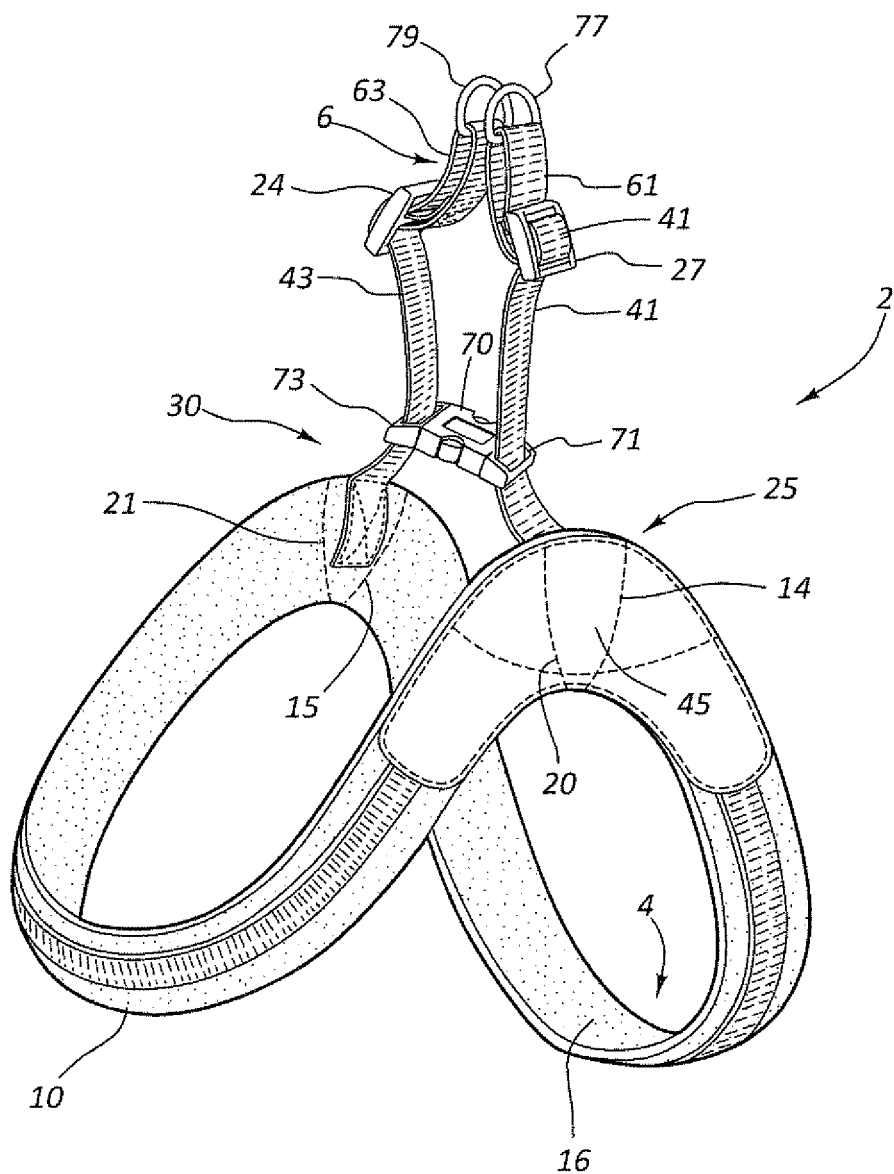
FIG. 1 is a perspective view of the preferred embodiment of the dog harness of the present invention.

The dog harness 2 of the present invention includes a body portion 4 and the fastener assembly 6, as seen in FIG. 1.

The body portion includes a strap or band 10 that is adapted to be positioned over the dog's prosternum 12 with ends 14 and 15 that terminate over the dog's shoulders. The body portion also includes a strap or band 16 that is adapted to be positioned around the dog's sternum 18 with ends 20 and 21 that terminate over the dog's shoulders. The ends 14 and 20 of the straps 10 and 16 that terminate over the left shoulder are interconnected at an angle forming a first harness apex 25. The ends 15 and 21 of the straps 10 and 16 that terminate over the right shoulder are interconnected at an angle forming a second harness apex 30.

The fastener assembly 6 includes first and second web members 41 and 43 each having proximal ends 45 and 47 and distal ends 49 and 51, the proximal ends of which are sewn or otherwise affixed to the respective harness apexes 25 and 30. Each of the web members traverses the interior open spaces of sliplock buckles 27 and 29, the middle bars 31 and 33 of which anchor the distal ends 49 and 51 of the web members. Between the distal ends of each of the web members and the point where the web members traverse the sliplock buckles, loops 53 and 55 are formed each having inner 57 and 59 and outer 61 and 63 runs. Adjusting the positions of the sliplock buckles on the web members regulates the size of the loops.

Figure 2:
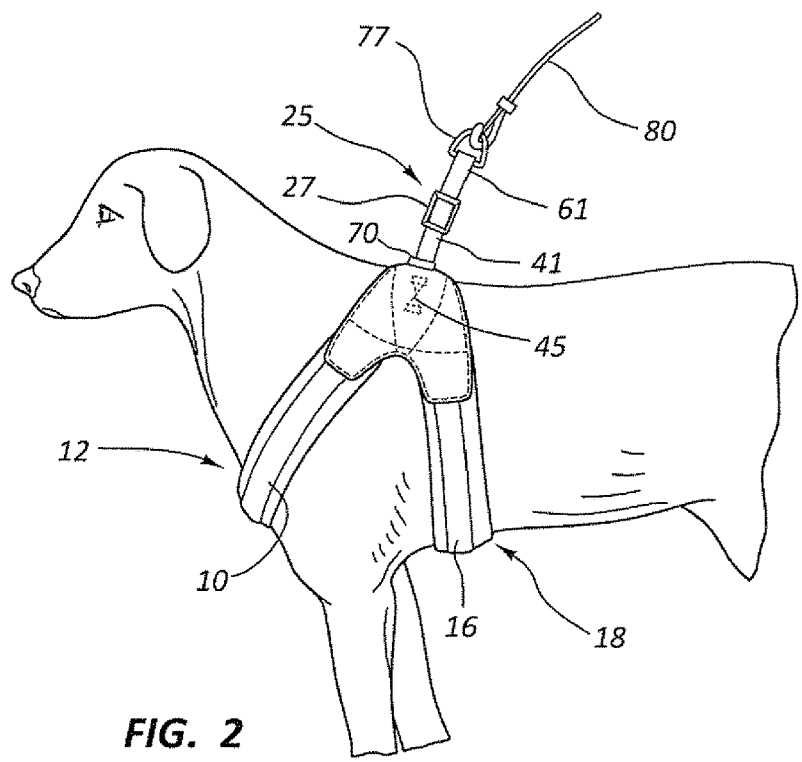
FIG. 2 is a fragmentary side view of a dog wearing the harness of the present invention.
Figure 3:
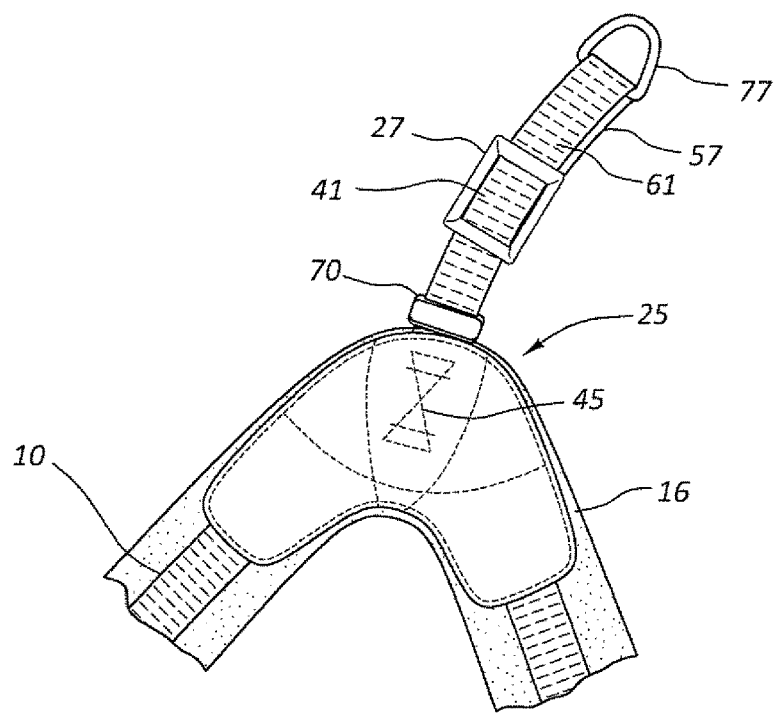
FIG. 3 is a fragmentary side view of one of the side apexes of the harness and the attached web member that forms a loop above the point of attachment between the web and its associated apex.
Figure 4:
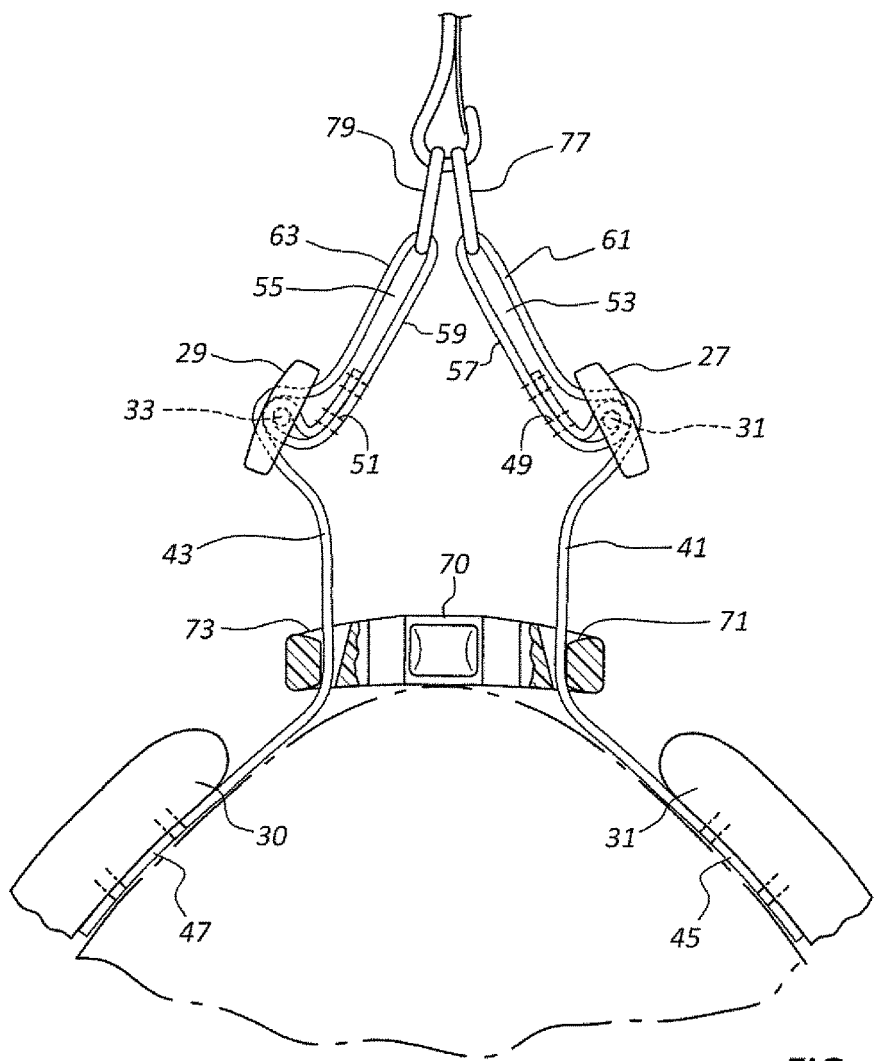
FIG. 4 is a fragmentary cross sectional view of the fastener assembly that interconnects the two side apexes of the harness.
Figure 4A:
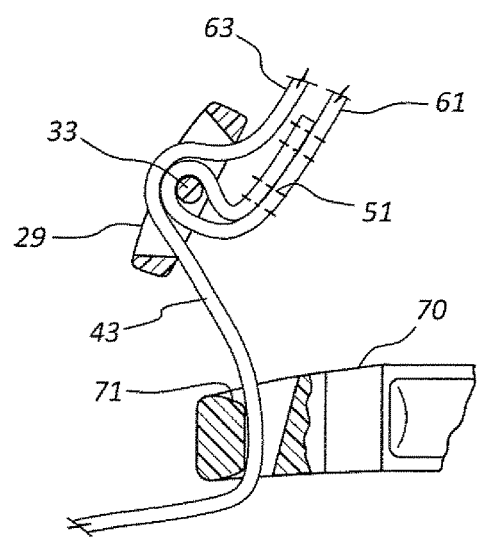
FIG. 4a is an enlarged fragmentary cross sectional view of the sliplock buckle and the connecting end of the side release buckle together with the web member that forms one side of the fastener assembly.

The web members 41 and 43 are interconnected with a side release buckle 70 at points between the sliplock buckle and the point of web attachment to the respective apexes. As seen in FIGS. 4 and 4A the web member 41 and 43 pass though end openings 71 and 73 respectively in the buckle 70. The spacing and fit between the web members and the side buckle's connecting slots is such that the buckle can freely slide on the web members. That portion of each of the web members that form the loops 53 and 55 traverses through respective D-rings 77 and 79 in such a manner that the rings can freely slide on the loop portions of the web members, easily accommodating changes in the size of the loops. The D-rings are intended as the anchor points for connecting a leash 80, as shown in FIG. 2.

The great advantage of the fastening configuration of the harness of the present invention is its ability to accommodate dogs of varying shoulder breadth and to provide a greater range of tightness of fit. Shortening the web loops 53 and 55 by adjustment of the sliplock buckles 27 and 29 increases the length of the web members 41 and 43 between the apexes and the sliplock buckles allowing the distance between the apexes to expand for bigger dogs. Conversely, lengthening the web loops will shorten the length of the web members between the apexes and the sliplock buckles and when the side release buckle 70 is closed the distance between the apexes is shortened to accommodate dogs having narrower shoulder spans.

In operation on a dog, the disclosed fastener assembly allows for simple and fixed adjustment of the spacing between the harness apexes and that spacing will not vary as a function of tension on the leash.

I claim:

1. A dog harness comprising,
   an open ended prosternum flexible loop having first and second terminal ends,
   an open ended sternum flexible loop having first and second terminal ends where the first end of the sternum loop is angularly affixed to the first end of the prosternum loop forming a first apex and the second end of the sternum loop is angularly affixed to the second end of the prosternum loop forming a second apex,
   first and second elongated web members each having distal and proximal ends, where the proximal ends are affixed to the first and second apexes respectively and the distal ends each form a closed loop,
   a sliplock buckle carried by the web member in each closed loop to adjust the length of the respective loop, and
   a buckle selectively interconnecting the first and second web members at points between the sliplock buckles and the respective apexes.

2. The harness of claim 1 and further including a D ring slidingly entrapped within the closed loop formed by the first and second web members.

3. A dog harness comprising,
   an open prosternum loop having first and second ends,
   an open sternum loop having first and second ends,
   first and second inverted V shaped shoulder covering apexes each respectively formed by fixedly interconnecting the first ends of the prosternum loop and the sternum loop and the second ends of the prosternum loop and the sternum loop,
   a fastener assembly comprising,
   first and second web members each having proximal and distal ends, a sliplock buckle having a middle bar carried by each of the web members, where the proximal ends of the web members are secured to the respective apexes and where the web members each form a web loop where the distal ends of the web members are secured to the middle bars of the respective sliplock buckles, a side release buckle slidingly interconnecting the first and second web members at points intermediate the sliplock buckles and the apexes.

* * * * *